United States Patent [19]
McKenzie et al.

[11] 3,890,836
[45] June 24, 1975

[54] AUTOMATIC TEMPERATURE CONTROL SYSTEM ANALYZER

[75] Inventors: James M. McKenzie, Tarrytown; Jeffrey L. Sachs, Harrison, both of N.Y.

[73] Assignee: Draf Tool Co., Inc., Bedford Hills, N.Y.

[22] Filed: Oct. 15, 1973

[21] Appl. No.: 406,448

[52] U.S. Cl. .................. 73/168; 73/1 F; 324/73 R; 339/28
[51] Int. Cl.² ........................................ G01M 19/00
[58] Field of Search ............ 73/1 F, 168; 324/73 R; 339/28, 29 R

[56] References Cited
UNITED STATES PATENTS

| | | | |
|---|---|---|---|
| 2,238,958 | 4/1941 | Wells | 73/168 |
| 2,570,781 | 10/1951 | Duerr | 73/1 F X |
| 2,886,776 | 5/1959 | Knudsen | 73/1 F X |
| 3,028,543 | 4/1962 | Parmater et al. | 324/73 R X |
| 3,206,707 | 9/1965 | LoVetere | 339/28 |
| 3,686,954 | 8/1972 | Motl | 73/432 R |

*Primary Examiner*—Richard C. Queisser
*Assistant Examiner*—Frederick Shoon
*Attorney, Agent, or Firm*—Blum, Moscovitz, Friedman & Kaplan

[57] ABSTRACT

An automatic temperature control system analyzer especially suitable as an analyzer to accurately analyze the component parts of a plurality of different automatic air conditioner systems in an automobile. The analyzer is interposed into the harness system of an automobile automatic temperature control system and switches set the analyzer into a mode corresponding to the particular type of automobile. Direct voltage readings are then made across the various components of the air conditioning system, known resistances being substituted by the analyzer to simulate certain components in certain tests. Deviations from recommended readings thereby enable malfunctioning components to be spotted and thereafter replaced.

8 Claims, 9 Drawing Figures

AUTOMATIC TEMPERATURE CONTROL SYSTEM ANALYZER

BACKGROUND OF THE INVENTION

This invention relates generally to an analyzer for an automatic temperature control system in an automobile and especially to an analyzer for measuring the direct voltages across major components of an automatic temperature control system. The use of automatic temperature control systems in automobiles has become extremely popular. Such systems are generally comprised of a string of sensors, a control panel, an amplifier, a transducer and a vacuum servo-mechanism. Because each manufacturer utilizes a different combination or variation of these major elements, it has become necessary to obtain detailed instructions supplied by the manufacturers and various equipment to make the necessary tests when the system in a number of different types of automobiles are to be serviced. The obtaining and use of such equipment is both inconvenient and expensive. The provision of a single apparatus in accordance with the invention capable of testing a number of different systems overcomes this problem.

SUMMARY OF THE INVENTION

Generally speaking, in accordance with the invention, an analyzer for testing a plurality of automatic temperature control systems by testing the major components of such temperature control systems is provided. The analyzer includes a meter for measuring the voltage applied thereto. Harness inter-position means are provided for interposing the analyzer in the electrical harness system of an automobile's automatic temperature control system at a plurality of connecting points. Model selector switching means are recoupled to the connecting points of said harness inter-position means for selecting an operative mode of said analyzer corresponding to the type of automatic temperature control system to be tested by providing a connection to the active connecting points associated with the type of system to be tested. A meter adaptor including a plurality of terminals for selectively coupling the meter to selected terminals dependent upon a type of system to be tested is further provided. Finally, a test selector and adapter circuit is electrically coupled to said mode selector means and to said meter adapter for interconnecting selected connection points through said mode selector switching means and meter means terminals and meter adapter means for the performance of at least two tests on each type of system.

Accordingly, it is an object of this invention to provide an improved automatic temperature control system analyzer capable of analyzing a plurality of automatic temperature control systems found in a plurality of different model automobiles in a highly accurate manner.

A further object of the invention is to provide an improved automatic temperature control system analyzer capable of providing various tests corresponding to the major components of an automobile's automatic temperature control system.

Still another object of the invention is to provide an improved automatic temperature control system analyzer capable of providing highly accurate results while being readily portable and compact.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
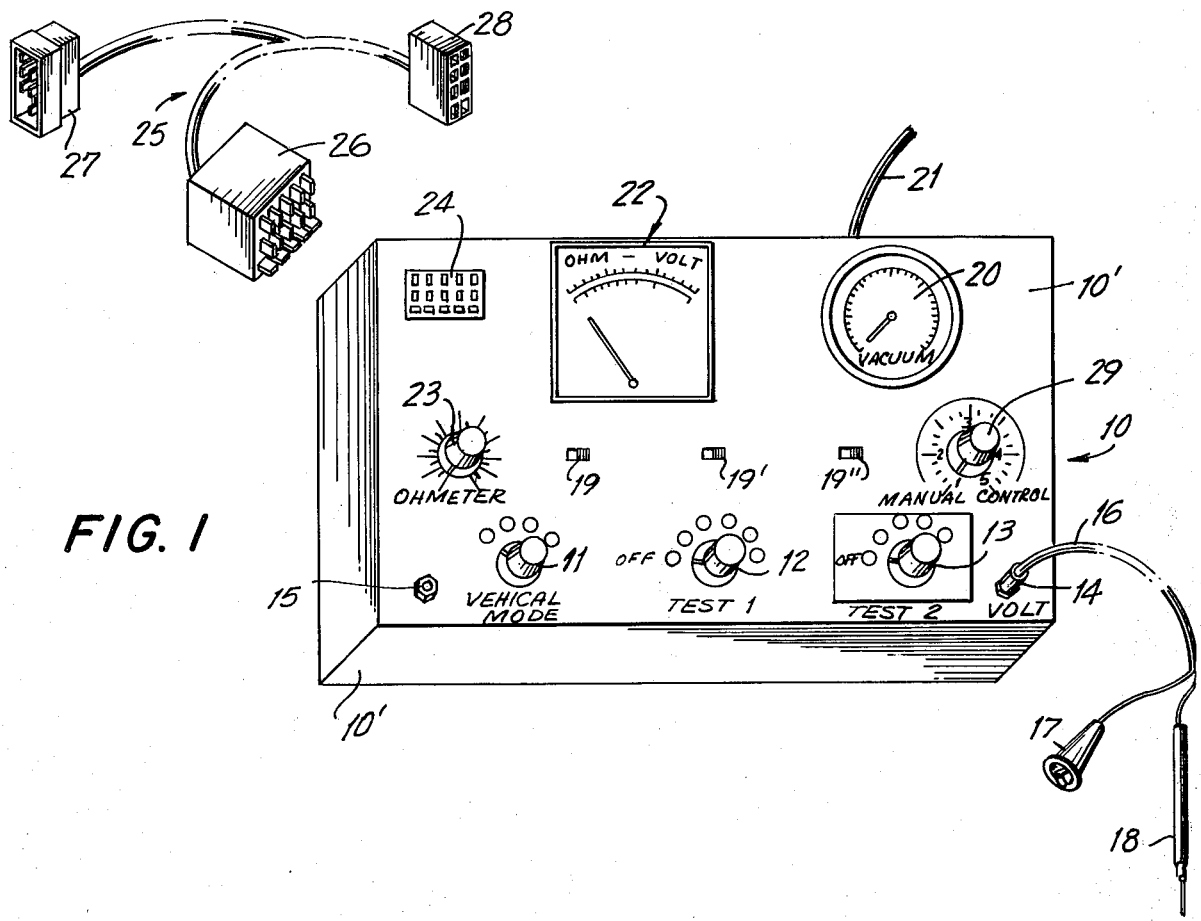
FIG. 1 is a perspective view of a portable automatic temperature control system analyzer constructed in accordance with the preferred embodiments of the instant invention.

Referring now to FIG. 1, an automatic temperature control system analyzer, indicated generally at 10, has a casing 10' which mounts various structural elements. Vehicle mode dial 11, first test dial 12, and second test dial 13 are mounted to the top wall of the casing and provide a function which will hereinafter be discussed. Temperature switch 19, compare switch 19' auto-manual switch 19'' are also supported in the top wall of the casing 10'. Vacuum gauge 20 is mounted to the top wall of the casing. A rubber tube 21 is connected thereto through the side wall of casing 10' to provide an input to the vacuum gauge 20. A second meter 22 contained in the top wall of casing 10' is adapted to measure both resistance and voltage and is coupled to an ohmmeter zeroing dial 23 as will hereinafter be discussed. Input jacks 14 and 15 provide input terminals for respectively selecting the voltage and resistance measurement configuration of meter 22. Probe 16 may be positioned in either of input jacks 14 and 15 and is provided with clip 17 and probe 18 for connection to the system to be tested. Also shown is a manual control dial 29 which controls three variable resistance potentiometers and will hereinafter be discussed. Finally, a harness coupling device, generally indicated at 25, is shown which is used to interpose the analyzer circuit in the harness system of an automobile. The harness inter-coupler 25 includes a male member 27 and a female member 28 which correspond to the harness connections in an automobile, the automobile harness connection points corresponding to the components of the air conditioning temperature control system. A second male member 26 is a master member and is compatible to female harness plug 24 which rests in the top wall of casing 10' and provides the requisite connections between the automatic temperature control system being tested and the analyzer 10. A plurality of harness intercouplers each are provided with members 27 and 28 specifically designed to mate with the harness of a particular automobile model automatic temperature control system.

Figure 2:
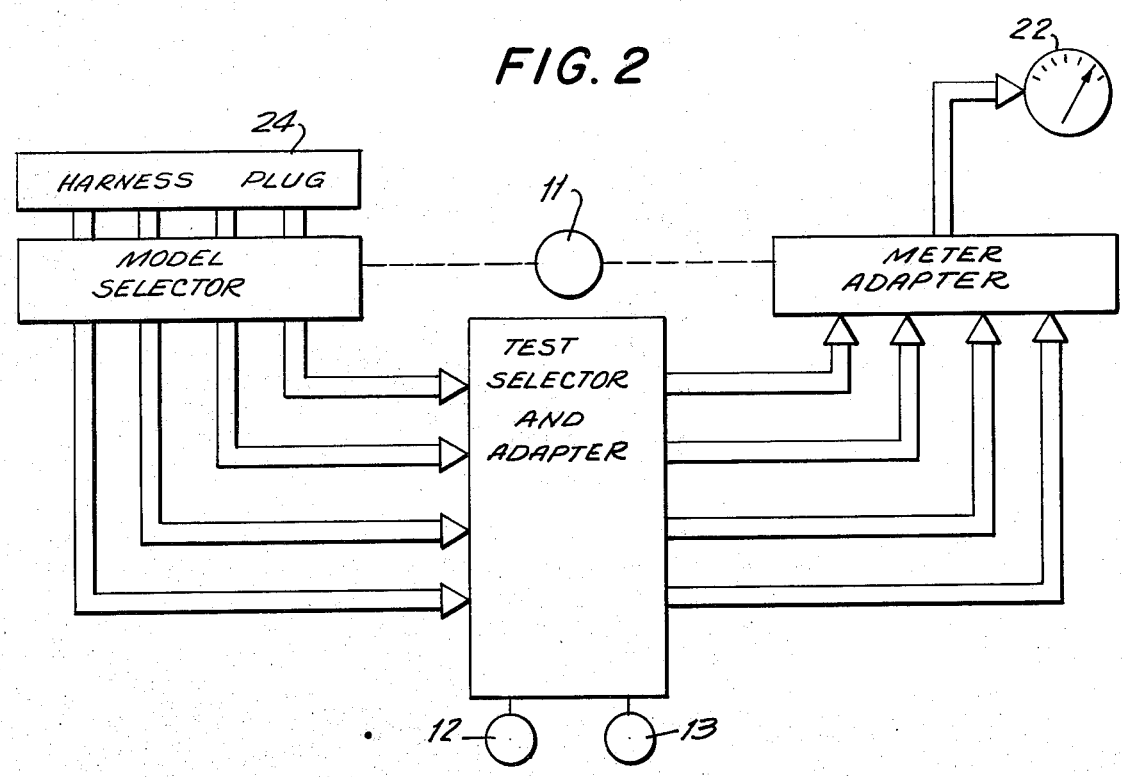
FIG. 2 is a block diagram of the system of components which comprise the preferred embodiments of the instant invention.

Referring now to FIG. 2, the block diagram depicted includes flow lines to show the overall interrelationship between the systems which comprise the instant invention. Female harness plug 24 is illustrated and is coupled to manually operated model selector. Said model selector adapts the analyzer to one of a plurality of modes each corresponding to one of the models of automatic temperature control systems to be tested by interconnecting selected pins of the harness plug corresponding to the above mentioned connecting points to selected inputs and outputs of a test selector and adapter, the selected pins, inputs and outputs corresponding to the model to be tested. The test selector and adapter permits manual selection of the specific tests to be performed on the automatic temperature control system model selected by the model selector as well as adapting the circuitry of the analyzer to the model selected for testing. If meter 22 is to be used for the test to be completed, the meter adapter selectively couples said meter to outputs of the test selector and adapter selected to correspond to the system model to be tested. The model selector and meter adapter are further illustrated in FIG. 2 as being mechanically coupled through vehicle mode dial 11 to insure coordinate operation thereof, so that the selected pins of harness plug 24 and meter 22 are coupled to corresponding inputs and outputs of the test selector and adapter for each model to be tested. The test selector and adapter is coupled to test switches 13 and 12 for control thereby.

Figure 3:
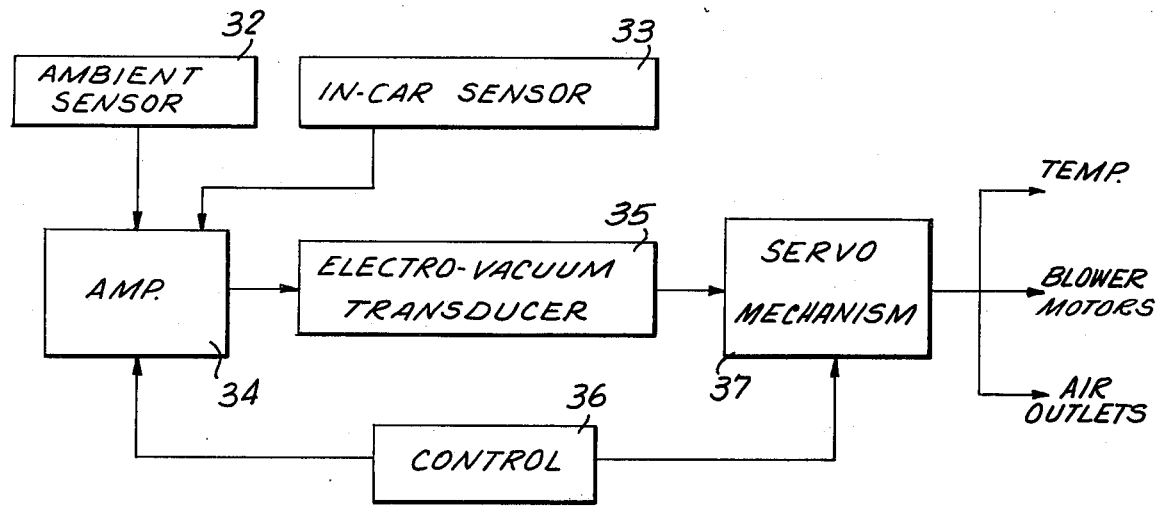
FIG. 3 is a block diagram illustrative of a typical automatic temperature control system.

Referring now to FIG. 3 there is illustrated therein, by way of example, a conventional automatic temperature control system. Two sensors are generally provided, ambient sensor 32 and in-car sensor 33. Such sensors are usually comprised of thermistors which emit a signal in correspondence to the temperature sensed. Ambient sensor 32 and in-car sensor 33 provide first and second inputs to amplifier 34. A third input to amplifier 34 is from control circuit 36 which correspond to the control panel on an automobile and supplies an input to the servo-mechanism 37. The control circuit 36 allows the passenger to designate a temperature at which he desires to have the car air-conditioned or heated. The amplifier receives the three signals supplied by the in-car sensor 33, the ambient sensor 32 and the control circuit 36 and supplies a composite signal to an electro-vacuum transducer 35. An electro-vacuum transducer signal is then applied to servo-mechanism 37 which compares the signal applied by the transducer with the signal applied by the control circuit and provides an output to control the temperature of the air to be blown by the system through control of the speed of the blower motors, which motors control the amount of air to be supplied and control of the air outlets which must be opened and closed in order to provide automatic temperature control of the air-conditioning and heating. In part, the analyzer 10 takes a direct voltage reading across selected terminals of the elements hereinabove mentioned and substitutes known resistances to simulate the temperature control dial of the car by using resistances which electrically simulate the maximum heat and the maximum cold settings. Then, the operation of the system is observed and deviations from reference readings thereby enable malfunctioning components to be ascertained. FIG. 3 depicts one typical automobile automatic temperature control system and is not a part of the invention herein disclosed. Moreover, such systems may take other forms as will be apparent from the following, presenting different components and/or modes of operation to be tested by the analyzer in a corresponding manner.

Referring now to FIGS. 4 through 8, illustrated therein are circuit diagrams representative of the circuit of one embodiment of the analyzer in accordance with the instant invention. FIG. 4a is a schematic representation of the model selector which consists of a first switch system I formed from 13 four-position rotary switches A, B, ..., M. All the rotors of the first switch system I are ganged together, by, for example, being mounted on the common shaft of vehicle mode dial 11. Each of said rotary switches has four fixed contacts or positions identified as 1, 2, 3 and 4 respectively, the rotors of all the switches engaging the same corresponding fixed contact (for example, contact 1), in sequence. Each fixed contact represents one of the four automatic temperature control systems to be tested. Female harness plug 24 has 13 pins numbered 1 through 13. The purpose of first switching system I is to couple selected ones of said pins to selected inputs and outputs of the test selector and adapter for each of said systems to be tested. A contact without a lead represents a no contact position of the switch.

Figure 4B:
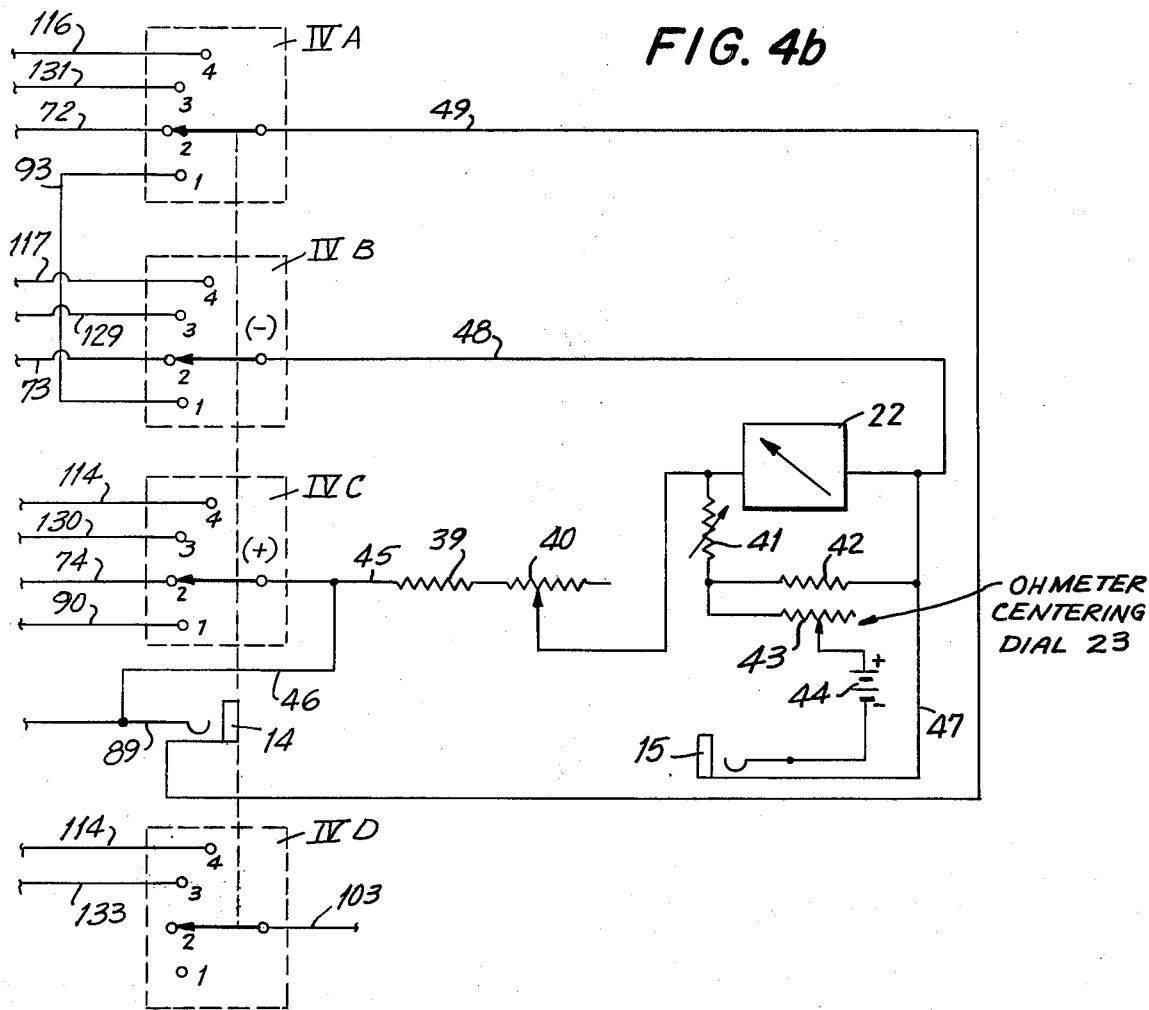
FIG. 4a and 4b are circuit diagrams of parts of the analyzer circuit constructed in accordance with the preferred embodiment of the instant invention.
Figure 4A:
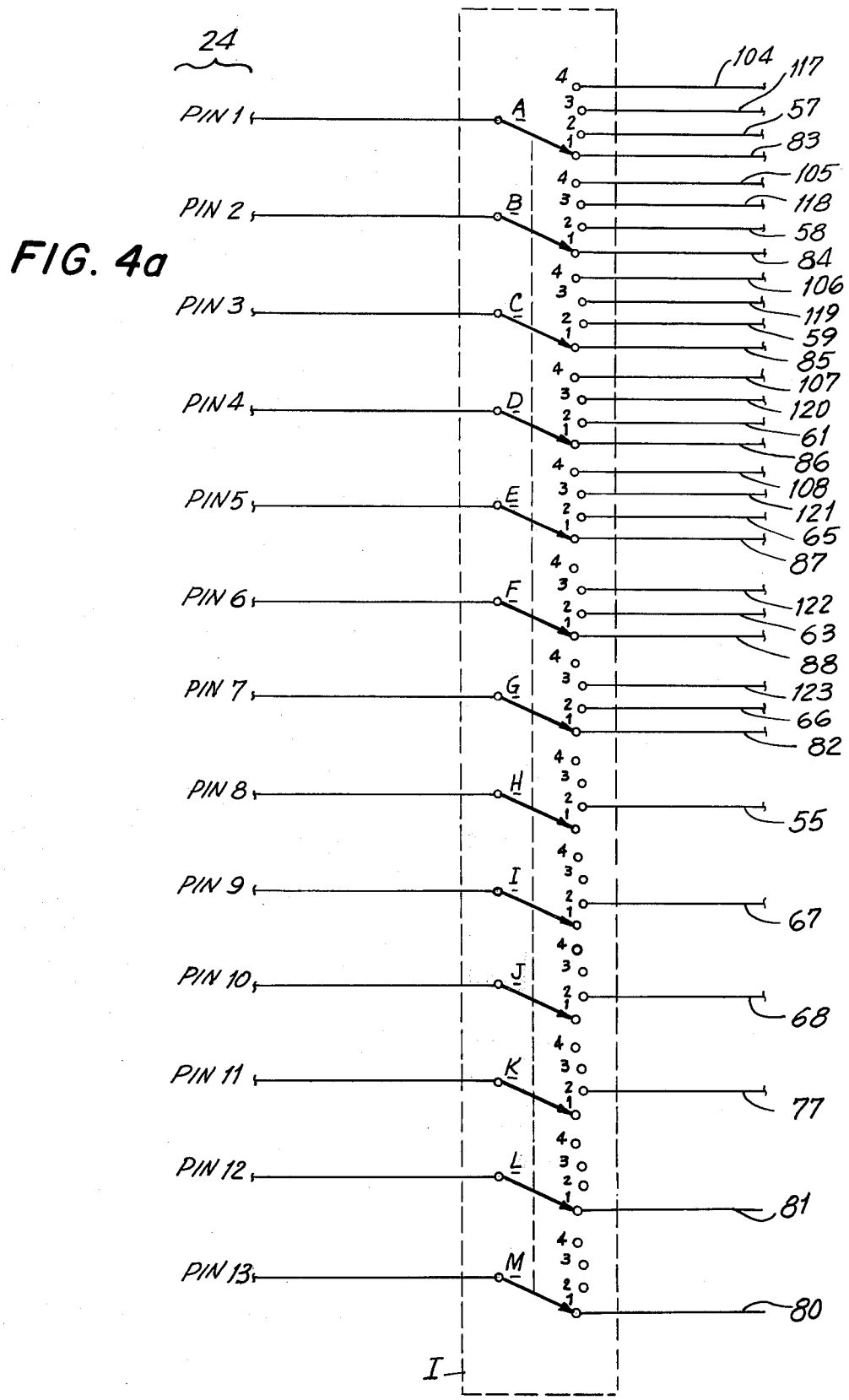

FIG. 4b depicts the meter adapter, meter 22, input jacks 14 and 15 and the connections therebetween. Meter 22 is coupled to four position rotary switches IVB and IVC, and is further connected to volt input jack 14 and ohm input jack 15. A variable resistor 41 and fixed resistor 42 are connected in series across the terminals of meter 22. A variable resistor 43, corresponding to ohmmeter zeroing dial 23, is connected between the junction of resistors 41 and 42 and the positive terminal of battery 44. The negative terminal of said battery is connected to one side of the ohm input jack 15. The other side of ohm input jack 15 is coupled through lead 47 to the junction between meter 22 and resistor 42 (defining the negative side of the meter). Coupled between the junction between meter 22 and resistor 41 (defining the positive terminal of the meter) and the rotor of switch IVC is the series connection of fixed resistor 39 and variable resistor 40. Variable resistor 40 permits calibration of meter 22 when said meter is used as a voltmeter. The rotor of switch IVC is further coupled to one side of volt input jack 14, which side of jack 14 is coupled to clip 17 when the probe 16 is inserted in said jack, probe 18 being coupled to the other side of the volt input jack and therefore to the rotor of switch IVA through line 49. Similarly, when probe 16 is inserted in ohm input jack 15, clip 17 is coupled to the negative side of battery 44 while probe 18 is coupled to the junction between meter 22 and resistor 42 through lead 47. Finally, lead 48 couples the negative side of meter 22 to the rotor of switch IVB. As will hereinafter be discussed, the switches IVA, IVB, and IVC electrically couple the voltmeter — ohm meter circuit to the selected outputs of the test selector and adapter corresponding to the model selected by first switch system I. Switch IUD is provided with the rotor thereof connected to line 103 and terminals 3 and 4 respectively coupled to lines 133 and 114. This switch interconnects selected portions of said test selector and adapter. The rotors of switches IVA, IVB, IVC, and IVD are ganged to the rotors of said first switch system I through vehicle mode dial 11 for coordinate operation thereby. Fixed contacts 1 through 4 of the respective switches IVA, IVB, IVC and IVD are therefore coupled to the test selector and adapter as will hereinafter be discussed with reference to the particular tests and modes of operation described in FIGS. 5 through 8.

Figure 5:
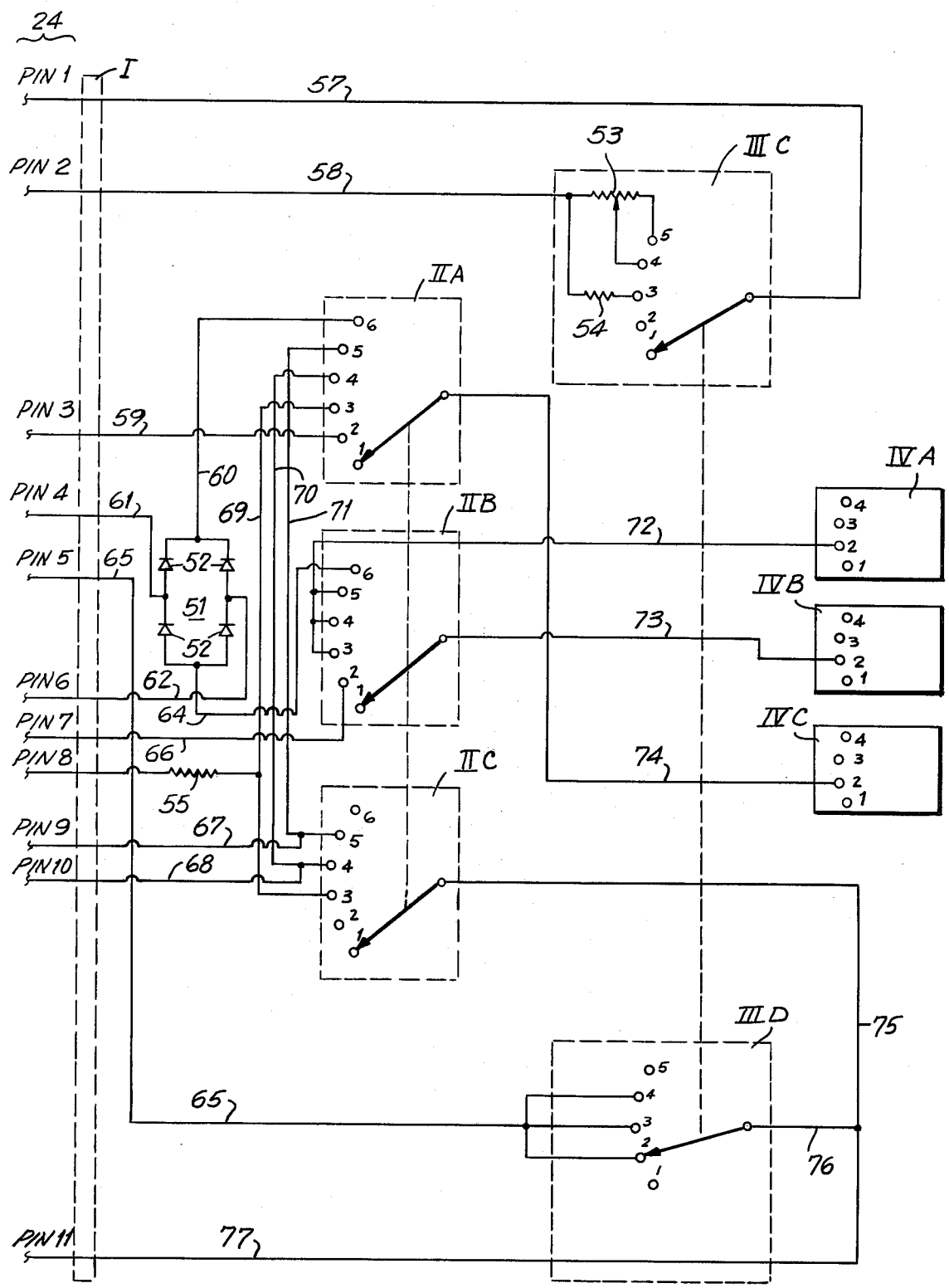
FIGS. 5, 6, 7 and 8 are each circuit diagrams of a portion of the test selector and adapter utilized in the testing of one type of system in accordance with the preferred embodiment of the invention.
Figure 6:
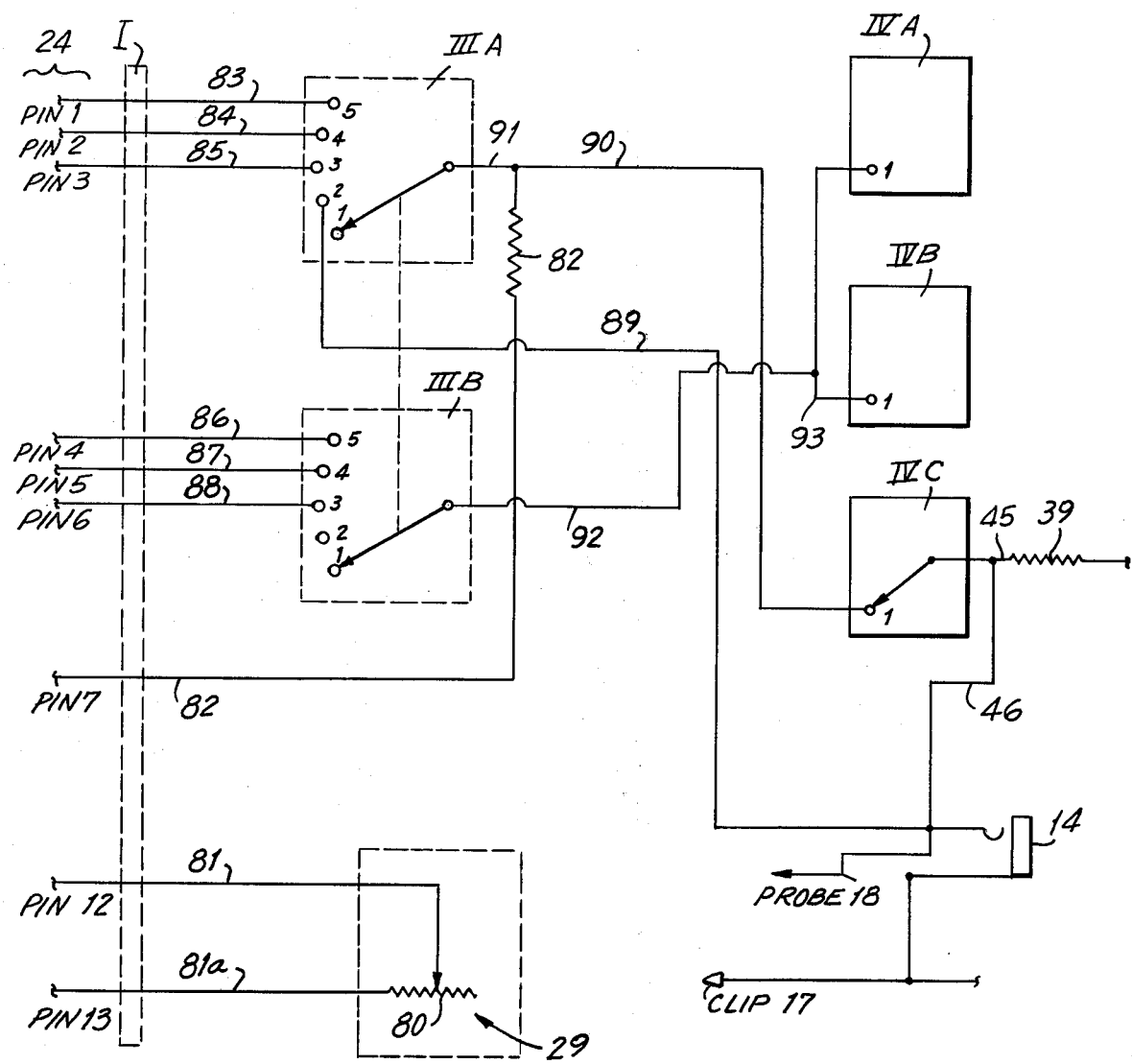
Figure 7:
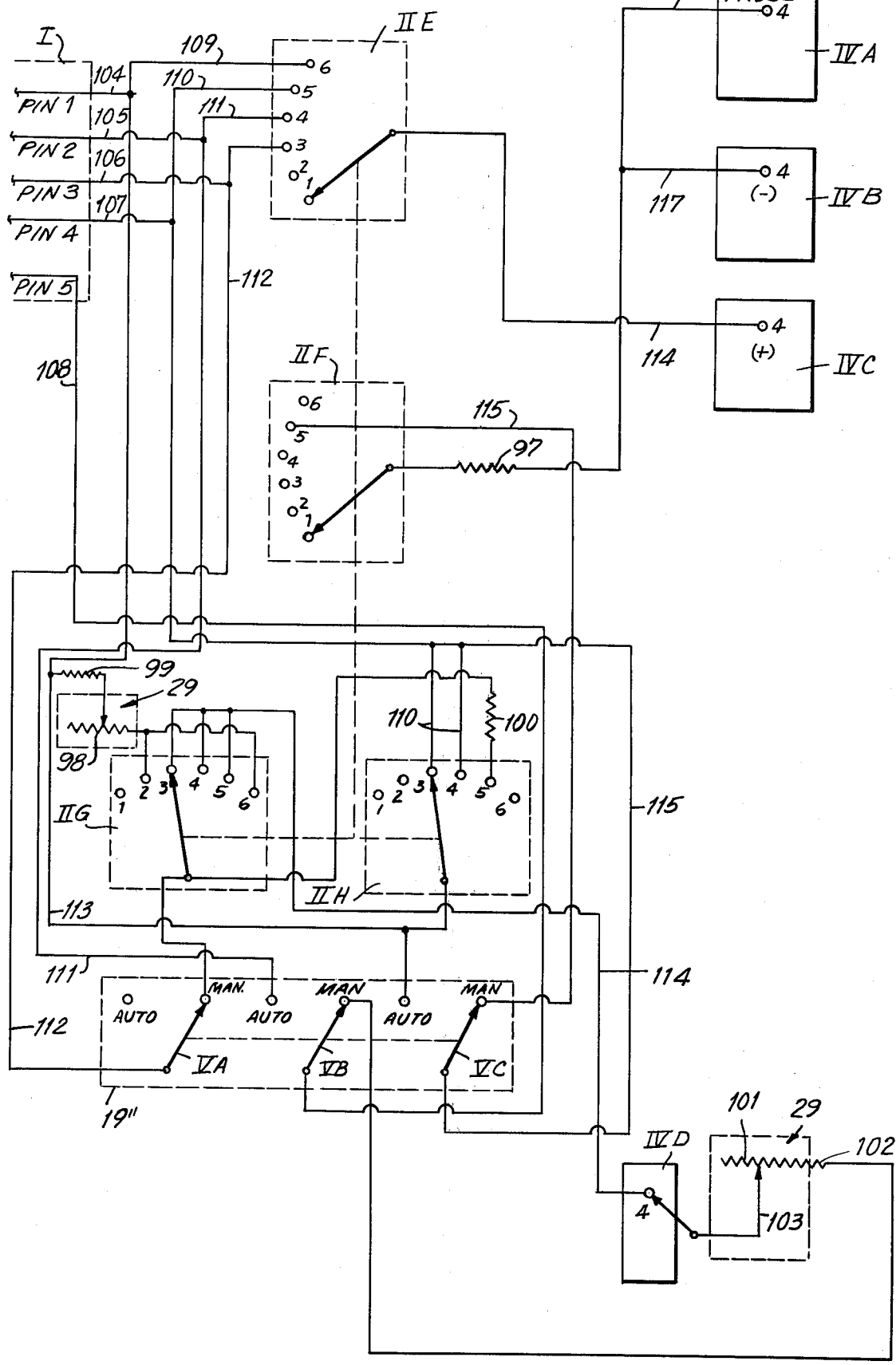

Referring now to FIGS. 5 through 8 wherein the test selector and adapter circuits are depicted, each of the FIGS. 5 through 8 includes all the elements which would become operative for a particular test mode. Thus, FIG. 5 illustrates those elements which become operative when the vehicle mode dial 11 sets the rotors of switches I and IV to terminal 2; FIG. 6 corresponds to a setting of terminal 1; FIG. 7 corresponds to terminal 3. Switches I and IV are mechanically coupled to vehicle mode dial 11 and dial 11 is maintained in a single position during testing of each air conditioning and heating system type. A preferred type of mechanical coupling would be to place the terminals and rotors of switch IV in a series of decks each deck having separate terminals for each switch and to have a single shaft element which controls the movement of all the rotors simultaneously. As switches I and IV have been completely disclosed with respect to FIGS. 4a and 4b, they will not be completely shown in FIGS. 5 through 8 but instead, only the pertinent connections thereof will be shown in these figures.

Referring specifically to FIG. 5, the portion of the test selector and adapter circuit of analyzer 10 illustrated therein is that portion which is actuated when the rotors of switches I and IV are rotated to contact terminal 2 thereof. Pin 1 of female harness plug 24 is coupled to the rotor of switch IIIC by lead 57. Pin 2 is coupled to junction of resistors 53 and 54, resistor 53 being further coupled to terminals 4 and 5 of switch IIIC and resistor 54 being coupled to terminal 3 of switch IIIC. Pin 3 is coupled to terminal 2 of switch 11A by lead 59. Pins 4 and 6 are coupled by leads 61 and 62, respectively, to the inputs of a full wave rectifier bridge 51, including diodes 52. The outputs of the rectifier bridge 51 are coupled through lead 60 to terminal 6 of switch IIA and through lead 64 to terminal 6 of switch IIB. Pin 5 is coupled through lead 65 to terminals 2, 3 and 4 of switch IIID. Pin 7 is coupled through lead 66 to terminal 2 of switch IIC. Pin 8 is coupled through resistor 55 to lead 69 which is coupled to terminal 3 of switches IIA, IIB and IIC. Pin 9 is coupled through lead 67 to lead 71 which couples terminal 5 of switch IIA to terminal 5 of switch IIC. Pin 10 is coupled through lead 68 to lead 70, and lead 70 couples terminal 4 of switch IIA to terminal 4 of switch IIC. Finally, pin 11 is coupled through leads 76 and 77 to the rotor of switch IIID and is further coupled through lead 75 to the rotor of switch IIC.

The circuit of FIG. 5 is coupled to the meter 22 by the meter adapter cirucit depicted in FIG. 4b. The coupling is achieved by coupling the rotor of switch IIA through lead 74 to terminal 2 of switch IVC, coupling terminals 3, 4 and 5 of switch IIB through lead 72 to terminal 2 of switch IVA and coupling the rotor of switch IIB through lead 73 to terminal 2 of switch IVB.

Reference is now made to FIG. 6 wherein the test selector and adapter circuit is illustrated and includes only those elements which would be operative were model selector dial 11 rotated to terminal 1 of switches I and IV. Pin 1 is coupled through lead 83 to terminal 5 of switch IIIA. Pin 2 is coupled through lead 84 to terminal 4 of switch IIIA. Pin 3 is coupled through lead 85 to terminal 3 of switch IIIA. Pin 4 is coupled through lead 86 to terminal 5 of switch IIIB by lead 86. Pin 5 is coupled through lead 87 to terminal 4 of switch IIIB. Pin 6 is coupled through lead 88 to terminal 3 of switch IIIB. Pin 7 is coupled through transistor 82 to the rotor of switch IIIA. Pin 12 is coupled to a potentiometer 80 which is further coupled to pin 13 through line 81a, potentiometer 80 comprising one level of manual control dial 29. As will become apparent below, manual control dial 29 consists of three potentiometers the wipers of which are ganged together to a single shaft rotated by dial 29. In one embodiment, the three potentiometers are stacked in three levels on said shaft.

The circuit depicted in FIG. 6 is coupled to the meter adapter circuit in the following manner: the rotor of switch IIIA which is coupled through resistor 82 to pin 7 is further coupled to terminal 1 of switch IVC; the rotor of switch IIIB is coupled through lead 92 to lead 93 which couples terminal 1 of switch IIIA to terminal 1 of switch IIIB. Finally, terminal 2 of switch IIIA is coupled through lead 89 to the side of voltage input jack 14 (line 46), to which probe 18 would be coupled.

Reference is now made to FIG. 7 wherein another part of the test selector and adapter circuit which becomes operative when the model selector and meter adapter switches are rotated to terminal 4. Pin 1 is coupled through lead 104 to lead 109 which couples terminal 6 of switch IIE to a first side of fixed resistor 99 and to lead 113. The other side of resistor 99 is coupled to a wiper of potentiometer 98 defining another level of manual control dial 29. Pin 2 is coupled through lead 105 to lead 111 which couples terminal 4 of switch IIE to the auto terminal of switch VB. Pin 3 is coupled through lead 106 to lead 112 which couples terminal 3 of switch IIE to the movable contact of switch VA. Pin 4 is coupled through lead 107 to lead 110 which couples terminal 5 of switch IIE to terminals 3 and 4 of switch IIH and further couples lead 110 to lead 115, which is coupled to the movable contact of switch VC. Pin 5 is coupled through lead 108 to the movable contact of switch VB. Lead 113 is further connected to the auto terminal of switch VC and to the rotor of switch IIH. The resistor of potentiometer 98 is coupled to terminals 2 and 6 of switch IIG. Terminals 3, 4 and 5 of switch IIG are coupled through lead 114 to terminal 4 of switch IVD. The rotor of switch IVD is coupled through lead 103 to the wiper of potentiometer 101, defining still another level of manual control dial 29. The resistor of potentiometer 101 is coupled to the manual terminal of switch VB through fixed resistor 102. The rotor of switch IIG is coupled to the manual terminal of switch VA and is further coupled through resistor 100 to terminal 5 of switch IIH. The manual terminal of switch VC is coupled through lead 115 to terminal 5 of switch IIF. Finally, part of the test selector and adapter circuit illustrated in FIG. 7 is coupled through the meter adapter circuit to meter 22 by the following: the rotor of switch IIE is coupled through lead 114 to terminal 4 of switch IVC; and the rotor of switch IIF is coupled through resistor 97 to the junction formed by leads 116 and 117 which are coupled to terminal 4 of switches IVA and IVB respectively. Switches VA, VB and VC may be separate contacts of a single two-position switch corresponding to auto-manual switch 19″.

Figure 8:
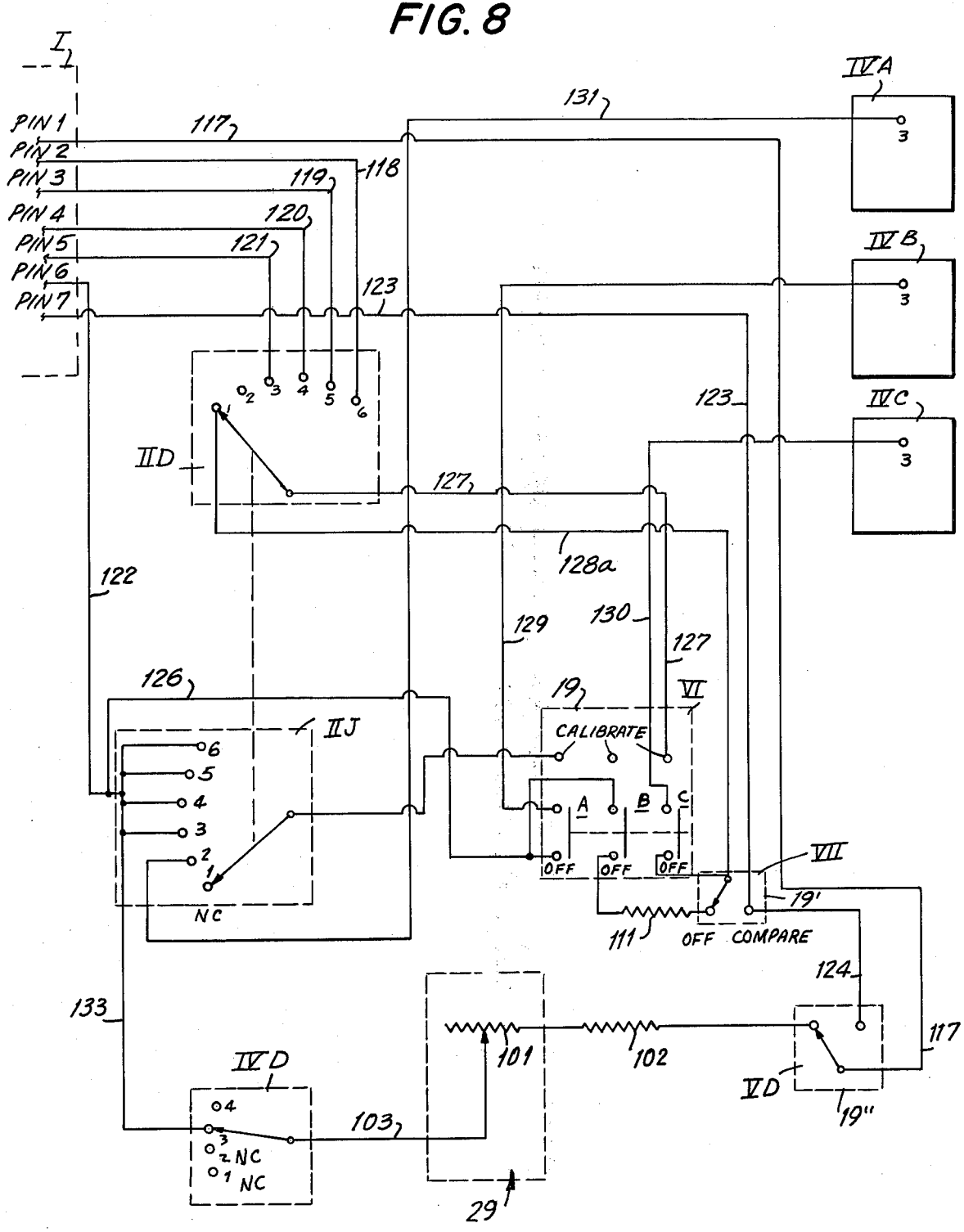

Reference is now made to FIG. 8 wherein a circuit diagram of the test selector and adapter elements which become operative when switches I and IV are rotated to terminal 3 is depicted. Pin 1 is coupled through lead 117 to the movable contact of switch VD, which switch may be still another set of contacts of automanual switch 19″. Pin 2 is coupled through lead 118 to terminal 6 of switch IID. Pin 3 is coupled through lead 119 to switch terminal 5 of switch IID. Pin 4 is coupled through lead 120 to terminal 4 of switch IID. Pin 5 is coupled through lead 121 to terminal 3 of switch IID. Pin 6 is coupled through lead 122 to leads 126 and 133. Lead 133 is coupled to terminals 3, 4, 5 and 6 of switch IIJ and is further coupled to terminal 3 of switch IVD. Lead 126 is coupled to the common terminal of each of slide switches VIA and VIB and to the off terminal of switch VIA. Switches VIA, VIB and VIC are separate contacts of a two-position slide switch corresponding to temperature switch 19. Each of switches VIA, VIB and VIC has a calibrate terminal, a common terminal and an off terminal, the movable contact closing the connection between said common terminal and either said off or said calibrate terminal. Pin 7 is coupled through lead 123 to the compare contact of spring-biased two-position switch VII, which is in turn coupled through lead 124 to the auto terminal of slide switch VD. Switch VII is a momentary contact switch spring biased so that the movable contact thereof normally engages the off contact. This switch corresponds to compare switch 19'. Terminal 1 of switch IID is coupled through lead 128 to the common terminal of spring-biased slide switch VII. The movable contact of spring-biased switch VII is coupled to the off terminal of switch VIC by lead 128 and to terminal 6 of switch IID by lead 128a. The rotor of switch IID is coupled through lead 127 to the calibrate terminal of switch VIC. The manual terminal of switch VD is coupled through resistor 102 to the resistor of potentiometer 101, which is controlled by manual control dial 29. The wiper of potentiometer 101 is coupled to the rotor of switch IVD. Finally, the test selector and adapter circuit is coupled through the meter adapter circuit to the meter 22 by the following connections: terminal 2 of switch IIJ is coupled through lead 131 to terminal 3 of switch IVA; the common terminal of switch VIA is coupled through lead 129 to terminal 3 of switch IVB; and the common terminal of switch VIC is coupled through lead 130 to terminal 3 of switch IVC.

In the foregoing FIGS. 5–8, switch system II corresponds to first test dial 12, while switch system III corresponds to second test dial 13. The separate switches of switch system II are ganged together, as are the separate switches of switch system III.

In order to discuss the several operative vehicle modes of the analyzer circuit, it is necessary to make reference to the several figures in the drawings. A first vehicle mode to be discussed is, in the embodiment depicted, the use of the analyzer 10 to test and analyze a 1971 or later model Chrysler automatic temperature control system, the settings for which are depicted in FIG. 5. The 1971 and later model Chrysler automatic temperature control system eliminates the transducer. Otherwise, the system is similar to that shown in FIG. 3. The tests hereinafter described are not a complete series, but rather are exemplary of how each and every element in the analyzer is utilized.

In order to make the analyzer operate effectively, certain connections must be made. The vacuum tube 21, coupled to vacuum gauge 20, must be coupled to the vacuum hose on the car in order to produce readings on gauge 20 which can later by compared to the readings taken by meter 22. Analyzer harness 25 is plugged into female receptacle 24 and is further interposed into the male portion of the electrical harness of a Chrysler of the selected year and the female section of the car harness by harness members 28 and 27, respectively. Finally, probe 16 is inserted in volt jack 14 and clip 17 is grounded. The car control dial is set at 75°.

The temperature switch 19 and compare switch 20 are in the off position. The auto-manual switch 19″ is in the manual position. Vehicle mode dial 11 is in the position at which the rotor of switch systems I and IV engage fixed contacts 2. Test dials 12 and 13 are in the position at which the rotors thereof engage terminals 1. Several primary tests are conducted upon the automatic temperature control system followed by several more secondary tests. The tests will be discussed in terms of the analyzer circuit.

For the first test, test selector and adapter dial 12, which corresponds to switch II, is turned to position 2, and test selector and adapter dial 13, which corresponds to switch III, is also turned to position 2. The dials having been set, the car engine is then turned on and is idled at 1,000 rpm, and the automatic temperature control system is set at OFF. At this point the analyzer should have a voltmeter reading of zero and no air should be coming out of the car's vents. Next a sequence of buttons on the control panel of the automobile are pushed. First the HIGH AUTO is pushed in and second test dial 13 is switched to the 4 position. The voltmeter should read a predetermined value and the next output should be cold. If it does not, the possibility then exists that there is no refrigerant in the system. The LOW AUTO button is then pushed and second test dial 13 is positioned in the 2 position. If the voltmeter does not read a predetermined value or if hot air does not come from the vents, then there is a defective blower motor, or the heater valve thermostat is defective, or there is a vacuum leak. Referring again to FIG. 5, it can be appreciated that by rotating first test dial 11 to position 2, the rotors of switches IIA, IIB and IIC are turned to contact terminal 2. Similarly, by rotating second test dial 12 to position 2, the rotors of switches IIIC and IIID are rotated to position 2. Thus, the reading for the latter of the aforedescribed tests is taken between pin 3 and pin 7 and represents a voltage taken from pin 3 across lead 59, through switch IIA, through lead 74, through switch IVC, which is connected to the positive side of voltmeter 22, through the rotor of switch IVC. The other side of the voltmeter 22 is connected to pin 7 by a circuit formed of lead 48, the rotor of switch IVB, the lead 73 coupled to switch IVB, and lead 66 coupled to switch IIB.

In order to finish the first primary test, it is then necessary to turn second test dial 13 to position 4, which corresponds terminal 4 of switching means III. As is appreciated by the skilled artisan, the rotation of the rotor of switches IIIC and IIID to the fourth terminal adds an impedance between pin 1 and pin 2 and connects pin 5 and pin 11. If the HIGH AUTO button is then turned on the voltmeter and vacuum gauge should read predetermined values. If the values are not met, either a defective blower motor, water valve or thermostat, or a vacuum lead is indicated. Readings are then taken on the voltmeter and vacuum gauge by pushing the DEFROST and then the HIGH DEFROST buttons on the car's control panel. If the values are not met, the possibility of a defective motor switch, defective blower motor or a vacuum leak is then indicated.

The next primary test is directed at analyzing the sensor string. Again, the test is begun by setting test dials 12 and 13 to position 2. The engine is started and is idled at 1,000 rpm, and the automatic temperature controls are set in the LOW AUTO position. Then, first test dial 12 is sequentially set to positions 3, 4 and 5 in order to test the ambient sensor, temperature control dial and in-car sensor, respectively. Direct voltage readings are thus made across each and compared with predetermined values.

In another test, the analyzer harness plugs are removed, as is clip 18. Probe 16 is inserted in ohm jack 15 and the resistance is measured across the ambient sensor and temperature control dial (at LOW AUTO) to test the calibration thereof.

The harness and ground connections are remade and another test is performed to find out if the servo-amplifier system is properly functioning. First test dial 12 is set to position 6 and second test dial 13 is set to position 1. It will be appreciated that a new circuit is now established which includes the rectifier circuit 51. The servo-control mechanism is measured and tested by testing the voltage between pins 4 and 6. The negative side of the voltmeter is connected to pin 4 by a circuit which includes lead 48, switch IVB, lead 73, switch IIB and lead 64. The positive side of voltmeter 22 is coupled to pin 6 through lead 145, switch IVC, lead 74, switch IIA, and leads 60 and 62, and rectifier 51. The engine is started and idled at 1,000 rpm and then second test dial 13 is shifted from position 1 to position 4 and then to position 2. From position 2, said second test dial is shifted to position 1, back to 2, then to 4 and back to 1. When said second test switch is in position 2, this connection shunts out the circuit between pin 5 and pin 11 and opens the circuit between pin 1 and pin 2. When second test dial 13 is set to position 4, the connection between pins 6 and 11 is short-circuited and an impedance which includes resistor 53 is added between pins 1 and 2 to simulate the resistance which would be generated by a thermistor during operation as a car sensor. Transient and steady state voltage readings are then taken to confirm proper operation of the servo-amplifier.

In summary, testing is achieved by taking direct voltage readings across the ambient sensor, temperature control dial, the in-car sensor, and a rectified voltage is read across te servo-amplifier after the voltage is passed through known fixed resistances, which fixed resistances simulate maximum cold and heat settings. Also, the voltage is read across the blower after the system sensor string is knocked out and fixed resistances are substituted. In this manner, the entire system is tested.

Other modes of operation are briefly discussed hereinafter. Referring to FIG. 6, operative elements of the analyzer that are utilized to test a pre-1971 Chrysler automatic temperature control system are shown. A direct voltage reading is taken across terminals of the ambient sensor, the temperature control dial, and the in-car sensor. Also during the testing operations, the sensor string is knocked out and signals which are corrected are sent to the amplifier. The signals are corrected by passing them through known temperature control potentiometers. As an example of how the test selector and adapter circuit elements depicted in FIG. 6 would be utilized, an example of a test made on the sensor string of the pre-1971 Chrysler will be hereinafter discussed. The first and second test dials 12 and 13 are set to position 1, and test selector vehicle mode dial 11 is set so that switches I and IV are set to contacts 1. The analyzer harness 26 is interposed in the car's harness system and is further plugged into female harness 24. The probe 18 is inserted into the volt jack 14, clip 17 is connected to a grounded terminal, and probe 18 is connected to the blower motor resistor. The vacuum gauge is interposed in car vacuum system at a predetermined location. The temperature and compare switches are off. The engine is idled at 1,000 rpm, the second test switch is set at 2, and the manual control dial 29 is set at 1. At various settings of the temperature control, the manual control dial is adjusted to achieve desired vacuum levels at which voltages are read or set to predetermined settings at which vacuum and voltage measurements are made. Similar tests are performed with second test switch 13 in the 1 position. With the second test selector in the 2 position and probe 18 disconnected, direct voltage measurements are made across the ambient sensor, temperature control and in-car sensor by resetting said second test switch to the 3, 4 and 5 positions, respectively. In the former tests, the sensors are "knocked out" and corrected signals, as determined by potentiometer 80, are sent to the amplifier. Various sensor conditions can be simulated in this manner.

Similarly, FIG. 7 shows those elements of the test selector and adapter circuit which become operative when a pre-1971 General Motors automatic temperature control system is tested. Again the principle is the same as those discussed above. Voltage readings are taken from the battery and across the sensors, and a direct voltage is read across the amplifier and transducer by substituting a known variable resistance for the sensors and the control potentiometer to simulate the operative conditions of the air conditioning control system. The following test, although not comprehensive of all the tests that the analyzer can make on a pre-1971 General Motors air conditioning test control system, is nevertheless demonstrative of how elements which are illustrated in FIG. 7 are used in operation.

Vehicle mode switch 11 is set so that rotors of switches I and IV engage contacts 4, the other switches being set to off or 1 positions, probe 16 being in volt jack 14. The vacuum gauge is connected to the car vacuum system and clip 17 is grounded. The harness 25 is plugged into the analyzer 10, and the other terminals of the harness are interposed in the car wiring harness.

Direct measurements of the source voltage are made by setting the car system on AUTO, manual control dial 29 on 3, and first test switch 12 on position 3. The voltage across the sensor string is measured by shifting first test switch 12 to position 4. Amplifier operation is tested by positioning first test switch 12 in position 5 and manual control dial 29 in position 5. The manual control dial is then shifted to position 1 and voltage measurements compared with predetermined values.

The transducer is tested by then setting first test switch 12 to position 6. The temperature dial can be calibrated by setting manual control dial 29 between 2 and 3 and first test switch 12 to position 5. The car temperature dial is then set to a temperature at which the voltage is known and the measured voltage is compared with the known value. The accuracy of the vacuum system may be coordinately determined as described above.

The amplifier and transducer measurements are made by substituting known variable resistors for the sensors and control potentiometers of the air conditioning system.

Finally, as illustrated in FIG. 8, the circuits included therein are the test selector and adapter circuit elements that are operative when testing a 1971 or later automatic testing control system in a General Motors automobile. Model selector and meter adapter dial 11 is rotated to position 3, which corresponds to terminal 3 of switches I and IV. In 1971 and later models, General Motors combined key components of an air conditioning control system into a unit called the programmer. The programmer contains an amplifier, a vacuum motor, a transducer, a vacuum valve and a vacuum check relay. The programmer is tested by substituting a known variable resistance into the circuit while cutting out the car sensors. As the substituted resistance is changed, readings are taken, and if the vacuum motor does not move or proper heat and cooling is not obtained, the programmer is taken out and the programmer components are tested separately. Voltage and vacuum readings are taken to test the condition of the blower and relays.

In a first test, the harness is connected to the car and analyzer, the temperature and compare switches are off, vehicle mode switch 11 is set as stated above, first test switch 12 is set to position 3, second test switch 13 to position 1 and manual control dial 29 to position 5. The probe 16 is in volt jack 15. The car is idled at 1,000 rpm, the car system set at AUTO and the voltage noted. The manual control dial is lowered and the voltage and operation generation of the vacuum motor noted. A similar test can be performed by coupling the vacuum gauge to the system and noting vacuum. If the voltage tests are not satisfactory, it is then necessary to remove the programmer from the car system and replace the whole system or provide separate bench tests which may be performed by the analyzer system.

In the next test, auto-manual switch 19'' is set at automatic while test switches 12 and 13 are in the 1 position. Manual control dial 29 is set at between 2 and 3. The car is run at 1,000 rpm, the system is in the AUTO setting, and the position of the vacuum motor is noted. This position should be maintained if auto-manual switch is shifted to manual and system is in calibration.

The temperature dial is calibrated by setting first test switch 12 in the second position, manual control dial and second test switch at 1, temperature switch at calibration, and auto-manual at manual. The car is run at 1,000 rpm with control at VENT and voltage read. The compare switch is held at the compare setting and temperature set to get the same voltage. If temperature is not at predetermined value, the temperature dial needs adjusting or replacement.

The blower circuit is tested by setting first test switch at 5, the second test switch and manual control dial at 1, auto-manual switch at manual, and temperature and compare switches on OFF. The car is run at 1,000 rpm with system at defrost. A voltage reading indicates Lo relay is operative. The first test switch is moved to position 4 and the voltage read, giving an indication of programmer operation. With the system at AUTO, first test switch 12 is set to position 6 and back to 4. Defects in the auto relay and programmer are thus detected.

It is understood that the analyzer discussed herein is illustrative of four modes of operation, namely, Chrysler automatic temperature control systems before 1971 and after 1971 and General Motors automatic temperature control systems before 1971 and after 1971. The analyzer herein described is a preferred embodiment and the invention is not limited to such vehicle modes but can be used for any automatic temperature control system comprised of the basic components or variations described above.

It will thus be seen that the objects set forth above, among those made apparent from the preceding description, are efficiently attained, and since certain changes may be made in the above construction without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An analyzer for testing a plurality of automatic temperature control systems comprising in combination:

meter means for measurement of a voltage applied thereto;

harness interposition means adapted to interpose said analyzer into the electric harness system of an automobile's automatic temperature control system at a plurality of connection points;

model selector switching means electrically coupled to the connection points of said harness interposition means for selecting an operative mode of said analyzer corresponding to the type of automatic temperature control system to be tested by providing connection to the active connection points associated with said type of system;

meter adapter means including said meter and a plurality of terminals for selectively coupling said meter means to selected terminals dependent upon the type of system to be tested;

test selector and adapter means electrically coupled to said mode selector means and meter adapter means for interconnecting selected connection points through said mode selector switching means and meter adapter means terminals for selectively modifying or channeling the signals therebetween for the performance of at least two tests on each type of system, and a rectifier having input terminals coupled to said mode selector means and output terminals coupled to said test selector and adapter means.

2. An analyzer as claimed in claim 1, wherein said mode selector switching means and said meter adapter means are coupled for time coincident manual operation.

3. An analyzer for testing systems including sensor means and control means as claimed in claim 1, wherein said test selector and adapter means includes a first switching means which couple selected connection points selected by said mode selector means to selected terminals of said test selector and adapter means to provide an impedance means connected between selected ones of said terminals for connection between said connection points to simulate the operable conditions of at least one of said system sensor means and control means.

4. An analyzer as claimed in claim 3, wherein said impedance means is a potentiometer means.

5. An analyzer as claimed in claim 3, wherein separate potentiometer means is provided for different systems to be tested, said potentiometer means being ganged together for coordinate manual operation.

6. An analyzer as claimed in claim 1, wherein said meter means is adapted to measure resistance, said meter adapter means including an external jack, circuit means coupling said jack and said meter means for measurement of a resistance connected across said jack.

7. An analyzer as claimed in claim 1, wherein said mode selector means and said meter adapter means each includes a plurality of rotary switches mechanically coupled to a single rotor.

8. An analyzer as claimed in claim 1, including vacuum gauge means for coupling a vacuum gauge to said system for the measurement of pressure on said line time coincident with said other tests on said system.

* * * * *